Figure 1:
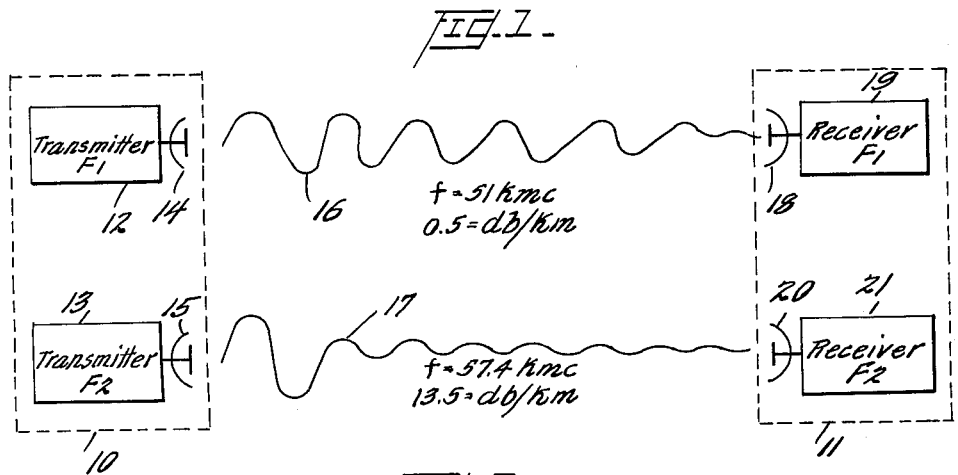

July 16, 1963

H. C. ANDERSON 3,098,225

MEASURING PROCESS

Filed June 20, 1961

2 Sheets-Sheet 1

INVENTOR
Harold C. Anderson,

BY Alfred B. Levine

ATTORNEYS

July 16, 1963     H. C. ANDERSON     3,098,225
MEASURING PROCESS
Filed June 20, 1961     2 Sheets-Sheet 2
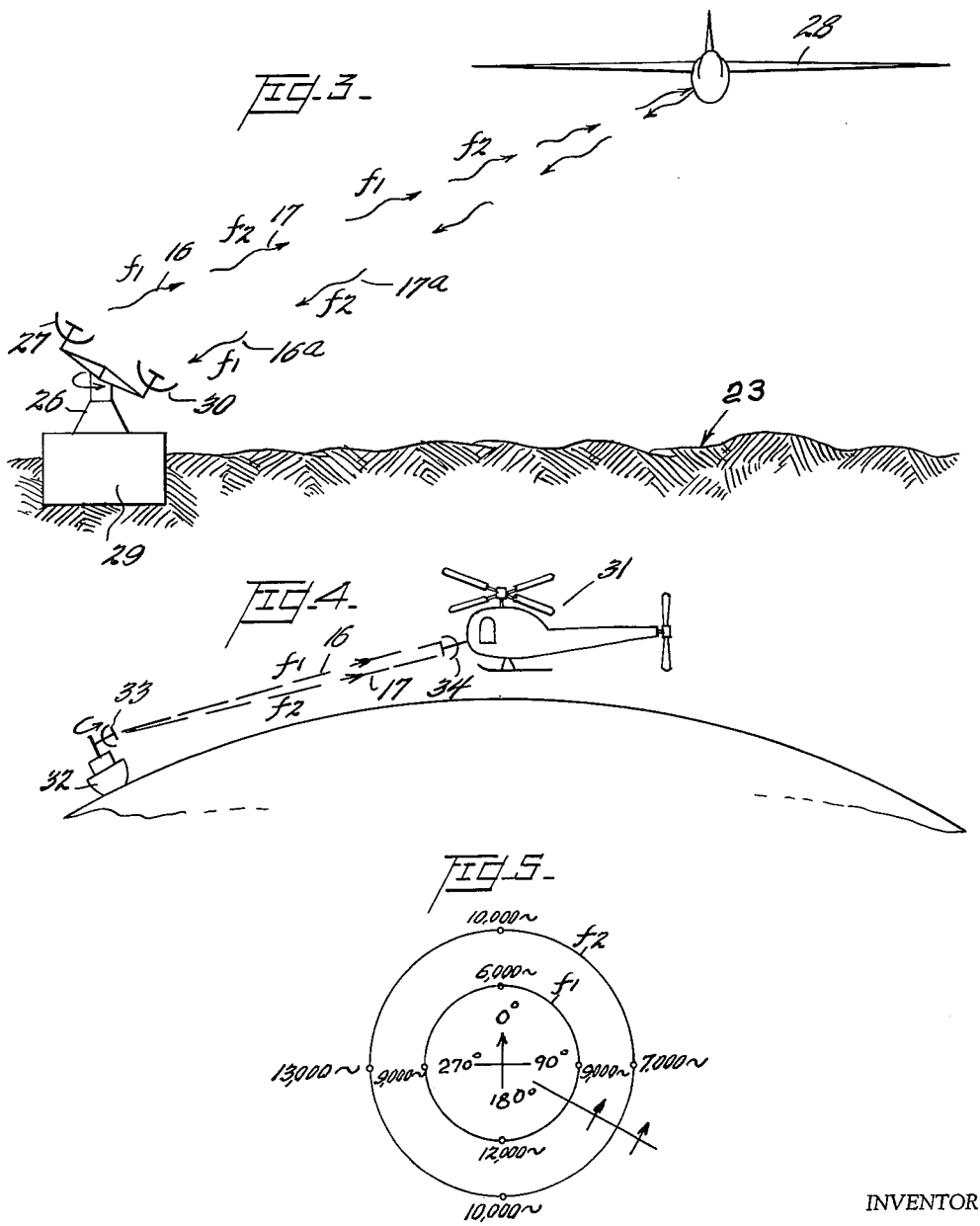
INVENTOR
Harold C. Anderson,
BY Alfred B. Levine
ATTORNEYS United States Patent Office 3,098,225
Patented July 16, 1963

3,098,225
MEASURING PROCESS
Harold C. Anderson, Silver Spring, Md., assignor to Litton Systems, Inc., College Park, Md.
Filed June 20, 1961, Ser. No. 118,467
15 Claims. (Cl. 343—12)

This invention generally relates to improvements in the locating of objects in the atmosphere, by such means as determining their range and bearing from known locations, and is particularly concerned with improved processes for this purpose employing the attenuation of electromagnetic radiations being propagated to travel between the object to be located and a fixed or known location or locations.

In an earlier application of the same inventor S.N. 47,443, filed August 4, 1960, there is disclosed a passive system and process for measuring the distance between two displaced objects by measuring the degree of atmospheric absorption or attenuation of electromagnetic waves traveling between the objects. In this prior application, the electromagnetic waves being produced between the objects are comprised of thermally generated radiations that are normally produced by all bodies heated above zero degrees Kelvin and therefore, this prior application is concerned with passive systems and processes for making these measurements.

According to the present invention, there is provided an active system and process for making these and additional measurements by determining the absorption or attenuation of electromagnetic waves or radiations, wherein the electromagnetic waves traveling between two displaced objects are actively produced by transmitters located at one or more of the objects.

According to one embodiment of the invention, a pair of active transmitters operating different fixed frequencies are provided at one of the objects and a pair of fixed frequency receivers at the other, with each receiver being responsive only to a different one of the transmitters. One of the transmitters produces a fixed frequency radiation at the frequency of an atmospheric absorption line having a known rate of attenuation and the other operates at a different fixed frequency outside any of the known absorption lines. The first transmitter is modulated or otherwise varied in a known manner to enable the noise being generated by the atmosphere at the same frequency to be eliminated whereby the strength of the signals being obtained at the receivers are compared and enable the calculation of the distance or range of travel of the beam passing between the two objects.

According to the further features of the invention, the bearing or relative angular positions of the objects may also be determined by the further steps of spatially scanning the radiated beams and modulating the beam differently at each spatial position according to a predetermined pattern or code. In this manner, the information obtained at the receivers not only permits a determination of the range or distance between the objects, but enables the beam receiving object to determine its bearing or angular position referenced to the transmitting object.

According to still additional features of the invention, the preferred process may also be employed to permit one object to distinguish from among a group of displaced objects and to determine its distance and/or bearing from a selected object among the group. This function is performed by imposing an additional form of modulation on the transmitted radio beams whereby the detecting object may select the radiant beams from the desired source and determine its position with respect thereto in the manner discussed above.

It is accordingly a principal object of the invention to provide an improved process for determining the distance or range between two objects by the attenuation of electromagnetic waves.

A further object is to provide such a process employing a pair of electromagnetic radiations at different frequencies being transmitted between the two objects.

A still further object is to provide such a process that eliminates the effect of extraneous noise being radiated at the same frequency.

A still further object is to provide such an improved process that is not adversely affected by rain, fog, or other extraneous disturbances.

Still another object of the invention is to provide such a process for determining the bearing or angular position between the objects.

Figure 2:
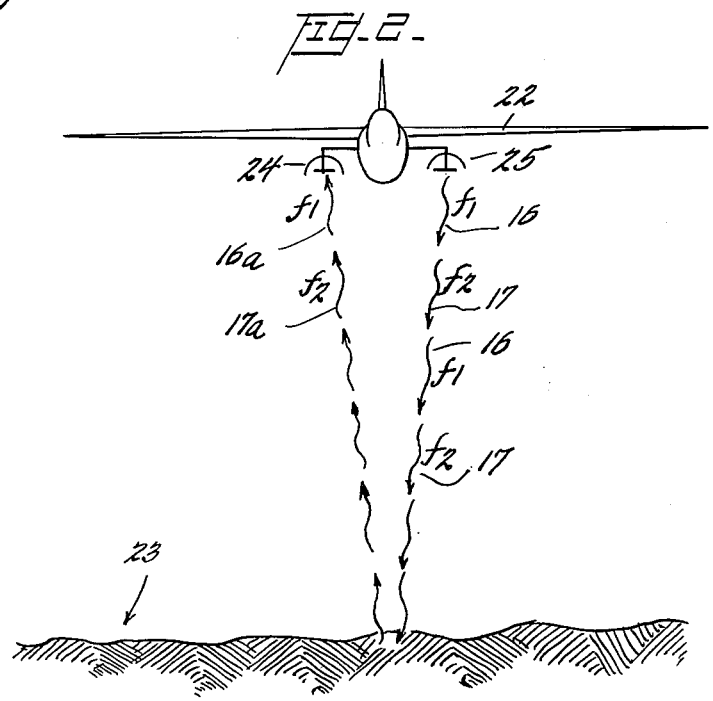

Additional objects and many other advantages will be more readily understood by those skilled in the art after a detailed consideration of the following specification taken with the accompanying drawings, wherein:

FIG. 1 is a schematic illustration depicting one manner of applying the invention for the measurement of distance between two displaced objects, FIG. 2 is a schematic illustration depicting the manner of applying the invention as an altimeter or the like, using reflected waves for determining the altitude of an aircraft above the ground, FIG. 3 is a schematic illustration depicting the application of the invention using reflected waves for detecting the presence and range of an aircraft or the like from a ground position in a manner similar to known radar techniques, FIG. 4 is a schematic illustration depicting the manner of applying the invention to enable the bearing or angular position of an aircraft to be determined as well as the range of the aircraft from a selected station, and FIG. 5 is a polar chart illustrating one manner of coding the transmitted signals according to the invention for obtaining azimuth or elevation bearing information from a selected station.

Referring now to the drawings for a detailed consideration of preferred embodiments employing the invention, there is shown in FIG. 1 one process for determining the distance between two displaced objects 10 and 11, separated from one another by the atmosphere. As shown, there is supported on the first object 10, a pair of radio transmitters 12 and 13, each operating at a fixed but different radio frequency, and each transmitting power from a separate antenna 14 and 15, respectively, at the same or a known power or intensity. On the second displaced body or object 11, there is provided a pair of receivers 19 and 21, with receiver 19 being tuned to selectively receive the radio beam 16 only at the frequency of transmitter 12, and with the second receiver 21 being tuned to selectively receive only the radio frequency beam 17 being produced by the second transmitter 13.

According to the invention, the transmitter 13 produces a fixed frequency beam 17 at the frequency of one of the absorption lines in the atmosphere, such as for example, at the oxygen absorption line frequency of 57.4 kilomegacycles. Consequently, at this frequency, the radio beam 17 is uniformly attenuated by oxygen absorption as it passes through the atmosphere and the degree of attenuation of radio wave 17 reaching the antenna 20 and receiver 21 at the second object 11 is proportional to the distance through which the radio beam 17 travels, or in other words, to the distance between the objects 10 and 11.

Concurrently with the transmission of radio beam 17, the transmitter 12 produces a second radio beam 16 at a different fixed frequency and lying outside of any of the atmospheric absorption lines, such as at the frequency of 51 kilomegacycles, and this latter radio beam 16 is detected by the second antenna 18 and receiver 19 after passing through the atmosphere. This second beam 16, however, is substantially unaffected by atmospheric absorption and consequently the power of the beam 16 being received at receiver 19 is not diminished to any extent by this effect. Thus, the receiver 21 detects a radio beam 17 that is diminished or attenuated by the effect of atmospheric absorption, whereas the second receiver 19 receives a radio beam 16 that is substantially unabsorbed in passing through to the atmosphere.

Since the rate of atmospheric absorption of the radio beam 17 is a constant and is known for the frequency selected, and since the power being radiated at both frequencies is the same or is known, the difference between the magnitude of the two beams reaching the receivers 19 and 20, is proportional to the distance or range between the objects 10 and 11 and may be easily calculated. For example, for the particular frequencies that are selected in the above example, it is known that the beam 17 at 57.4 kmc. will be attenuated or absorbed at the rate of 13.5 decibels for each kilometer of travel through the atmosphere whereas the beam 16 at 51 kmc. will only be attenuated at the rate of .5 decibel for each kilometer of travel. Presupposing, therefore, that the objects 10 and 11 are separated by a distance of 1 km., then the receiver 19 detects a signal that is attenuated by one-half decibel whereas the receiver 20 detects a signal that is attenuated by 13.5 decibels. The difference between the strengths of the two signals at the receivers 19 and 20 is, therefore, 13 decibels. Since it is known that an electromagnetic wave at a fixed frequency of 57.4 kmc. is attenuated by the oxygen absorption effect at the rate of 13.5 decibels per kilometer, then the difference in the detected power, or 13 decibels per kilometer, clearly indicates that the objects 10 and 11 are separated by a distance of one kilometer.

The foregoing example is, of course, simplified and neglects the effect of atmospheric noise being generated in the atmosphere, at the atmospheric absorption line frequency of 57.4 kmc. This noise results from the fact that a good absorbing medium, such as oxygen gas, also functions as a good radiating source and, therefore, produces an electromagnetic noise signal, due to its temeprature and other effects, that is produced at the same given frequency as beam 17, and is accordingly also detected by the receiver 21 along with the beam 17. Thus, as a practical matter, the magnitude of the signal received at antenna 20 is the sum of the transmitted signal or beam 17 and the atmospheric noise signal being produced in the atmosphere. The atmospheric noise signal is substantially constant at any given altitude and is produced at a power that is substantially the same as the power loss of the electromagnetic beam 17 being absorbed. Consequently, to determine the power loss of beam 17 by absorption, and hence the range or distance between the objects 10 and 11, it is necessary to distinguish between the noise signal and the radiated beam 17 since the total power being detected by antenna 20 from these two components is substantially the same as the power being detected by antenna 18 from the substantially unabsorbed radio beam 16.

To distinguish between the noise signal and the transmitted beam 17 according to the invention, the transmitter 13 is periodically modulated, such as being switched on and off or pulsed, with the receiver 21 being continually monitored to detect the difference in the power received when the transmitter 13 is turned off and turned on. When the transmitter 13 is turned on, the signal received is the sum of the power from beam 17 and the noise power whereas with the transmitter 13 being off, the power received is only from the noise radiations.

Since the noise radiation level is substantially constant, the increase in power received at the receiver 21 when the signal transmitter 13 is turned on constitutes a measure of the attenuated beam 17 as is desired, thereby enabling a determination to be made of the strength of the transmitter beam signal 17. As is believed now evident, the transmitter 13 may be otherwise modulated in any desired and known pattern to vary the amplitude or other characteristics of the beam 17 thereby enabling the power of beam 17 to be distinguished from the constant amplitude noise radiation. Since the noise level detected by the receiver 21 remains substantially constant whereas the signal obtained from beam 17 varies according to its modulation, any such variation of the transmitted beam 17 enables its separation from the constant noise radiation.

FIG. 2 illustrates one application of the process when employed as an altimeter located aboard an aircraft 22 to detect its altitude above the ground 23, or its range from other flying objects or stationary hazards such as mountains, tall buildings, and the like. In this application, both the transmitter and the receiver are carried by the aircraft 22. A pair of fixed frequency radio beams 16 and 17 are, therefore, transmitted from a transmitting antenna 25 toward the ground 23 or other obstacle and are reflected backwardly after striking the ground to be received by the aircraft receiving antenna 24.

More specifically, a pair of transmitters, such as 12 and 13 in FIG. 1, are carried aboard the craft 22 and may be each connected alternately in time sequence to a single transmitter antenna 25, to produce an alternate series of beamed impulses at a first frequency 16 and then at a second frequency 17 as generally indicated. These pulses of different frequency electromagnetic energy are beamed toward the ground 23 or other object whose distance from the craft is to be determined and are reflected from the object backwardly as indicated at 16a and 17a to be detected by the receiver antenna 24, also carried aboard the aircraft. The receiver antenna 24 is alternately switched in sequence to a pair of fixed frequency receivers, such as 19 and 21 in FIG. 1, where the magnitude of the signals at the two frequencies are determined and compared to ascertain the degree of attenuation or atmospheric absorption of the beam at frequency 17. As discussed above in connection with FIG. 1, the two frequencies are selected such that the frequency of beam 17 is at one of the known atmospheric absorption lines whereas the frequency of the second beam 16 lies outside any of the absorption lines of the atmosphere. In the same manner, therefore, the added degree of attenuation of the pulsed beam 17 over the pulsed beam 16 provides a measure of the total distance of travel of the beams through the atmosphere between the transmitting and receiving antenna, which, in this example, is approximately equal to twice the altitude of the aircraft 22 above the ground 23. Since the radio beam 17 is pulsed or intermittently produced, the substantially constant level noise radiation being produced at the same frequency may be distinguished from the beam 17, thereby to separate the signal obtained from beam 17 from the extraneous noise radiation. In this application, either a pair of antennae or a single antenna may be employed for each of the transmitting and receiving functions since the different frequencies of the signals may be relatively close together. In fact, by the addition of suitable switching means a single antenna may be employed for both transmission and reception of the pair of beams 16 and 17, if desired.

FIG. 3 illustrates an alternative manner of applying the reflected beam process of the invention in a manner likened to radar, to determine both the position of a flying aircraft 28 or the like and its range from a ground-based detecting station 29. As shown, the ground-based station 29 may be provided with a movable pedestal mechanism generally indicated as 26 for supporting both a transmitting antenna 27 and a receiving antenna 30 on a movable support for scanning the atmosphere in both azimuth and elevation. In this application, the ground station 29 is provided with both a pair of fixed frequency transmitters (not shown) and a pair of fixed frequency companion receivers (not shown), similar to those of FIG. 1, with the transmitters being alternately switched or connected to energize the single transmitting antenna 27 for alternately beaming different high frequency radiations in pulse form, indicated as 16 and 17, toward an unknown target, such as the aircraft 28. These pulses of electromagnetic energy are reflected from the aircraft 28 and returned, as indicated at 16a and 17a, to the receiving antenna 30 also mounted on the movable antenna structure. The receiving antenna 30 is likewise adapted to be alternately connected or switched in sequence to the two fixed frequency receivers where the magnitude of the signals received at the two frequencies are compared to determine the difference in absorption or attenuation at the two frequencies. In the same manner as discussed above in connection with FIGS. 1 and 2, the difference in attenuation of the two frequencies is accurately proportional to twice the distance between the ground-based station 29 and the aircraft 28, taking into account, of course, any displacement between the transmitting and receiving antennas 27 and 30, whereby the range to the target 28 may be easily calculated.

In a manner well known in the radar art, the azimuth and elevation angles of the target aircraft 28 may be determined by the azimuth and elevation line of sigh positioning of the antennae 27 and 30 with respect to the ground station 29 since the high frequency radio beams 16 and 17 travel straight line paths. Thus the target aircraft 28 may be accurately located both in range and in angular position from the fixed land-based station 29 as is desired.

In the embodiments of both FIGS. 2 and 3, where the beamed electromagnetic waves are to be reflected from a target, the two different frequency signals should be close enough together in frequency, so that the reflecting properties of the target are substantially the same at both frequencies. In the example given using frequencies of 51 kmc. and 57.4 kmc., these high frequency signals are sufficiently close together so that this requirement is easily satisfied.

FIG. 4 illustrates another embodiment of the invention wherein the preferred process is employed for enabling a moving object, such as an aircraft or helicopter 31 to determine its range and its angular position in both azimuth or elevation from a given base such as a ship or land-based airfield 32. For this application, the transmitters are carried by the ship 32 and the receivers are carried by the aircraft 31. To determine the range, the two fixed frequency electromagnetic waves 16 and 17 are beamed from a movable scanning antenna 33 or pair of antennae located aboard the ship which is nutated to continuously scan both in elevation and azimuth. A receiving antenna 34 or pair of receiving antennae are located aboard the aircraft 31 and detect the pair of beams 16 and 17. By comparing the relative magnitudes of the received beams at the two frequencies, the distance of the craft 31 from the ship 32 or other station can be determined.

For enabling the aircraft 31 to determine its angular position from the ship 32, the pulse rate of the beamed signals 16 and 17 coming from the ship may be varied in a predetermined coded arrangement for each different angular position of the scanning antenna 33 whereby upon detecting this code, the aircraft 31 may easily determine its angular position with respect to the ship or station 32.

Considering one preferred coding arrangement for azimuth determination, there is shown in FIG. 4 a polar chart illustrating one manner of varying the pulse rate of the two frequency beams. As shown, with the transmitting antenna 33 being positioned at zero (0°) degrees azimuth or at some other fixed reference angle with respect to the ship 32 or other known landmark, the beam 16 at one frequency is pulsed at a repetition rate of 6000 cycles per second and the beam 17 at the other frequency is pulsed at a different rate of 10,000 cycles per second.

As the antenna 33 is scanned to assume an angle displaced 90° from its initial reference position, the repetition rate of the first frequency beam 16 is progressively increased to a rate of 9000 cycles per second whereas the repetition rate of the second frequency beam is progressively reduced to 7000 cycles per second. Thus, if the aircraft detects the combination of beam 16 pulsing at 9000 c.p.s. and beam 17 pulsing at 7000 c.p.s., it is informed that its azimuth position is displaced from either the ship or other known reference by an angle of 90°. In a similar manner, at each different azimuth position assumed by the rotating antenna 33, the pulse rates of the beams 16 and 17 are different from those at other positions whereby as the antenna 33 is rotated to an angular position observing the aircraft 31, and the beams 16 and 17 are detected by the craft, the craft 31 may determine its azimuth position with respect to the craft 32 or other reference from its predetermined code of pulse rates received.

It will be noted from FIG. 4 that due to the fact that both pulsed beams 16 and 17 are employed for azimuth coding purposes, that the variation in the pulse rate of each beam is reduced over that required if only a single pulsed beam were employed for azimuth coding. For example, at both 90° and 180°, the repetition rate of beam 16 may be the same at 9000 c.p.s. due to the fact that the second beam 17 may be pulsed at the different rates of 7000 c.p.s. and 13,000 c.p.s. Similarly at 0° and 180°, the pulse rate of beam 17 may be the same at 10,000 c.p.s. since the beam 16 is pulsed at different rates of 6,000 c.p.s. and 12,000 c.p.s., thereby enabling these angular positions to be distinguished. For this reason each of the pulse rates of the two beams 16 and 17 may be progressively increased and decreased to a lesser extent as the antenna rotates over a full 360° arc, and the commutating means or switching means (not shown) for controlling the pulse rates may be accordingly simplified and reduced in complexity.

In a similar manner, the pulse rates of the two beams may be coded for scanning of the antenna 33 in elevation whereby for each different angular position in both azimuth and elevation being assumed by the antenna 33 during its nutating travel, the aircraft 31 may determine its angular position with respect to the ship 32 or other given reference.

According to the invention, it is also desired to provide means for enabling the aircraft or other body 31 to identify and distinguish the particular ship 32 or other station that it is seeking from among a group of such ships and to do so without the need for varying the frequency of beams 16 and 17 or the angular pulse coding of the beams. This may be performed by having each different ship 32 or other station vary the speed of rotation or nutation of its transmitting antenna 33 whereby the aircraft 31, by detecting the speed at which the beams 16 and 17 from a particular ship or base sweep past it, may identify that ship or station. For example, one ship 32 may rotate its antenna in azimuth at a speed of 3600 r.p.m., another (not shown) at a speed of 3000 r.p.m., and still a third (not shown) and additional stations at different speeds, either higher or lower. In each case, the fixed frequencies of the beams 16 and 17 emanating from each separate station are the same, as well as the pulsed coding rates of these beams. However, since each pair of beams 16 and 17 is sweeping past the aircraft 31 at a different speed from the others, the craft can identify the station it desires from the sweeping speed of the beams and thereby determine its range and bearing from the selected station.

Although in the above described embodiments only one pair of frequencies, at 51 kmc. and 57.4 kmc., have been discussed, the invention may be practiced at a number of different frequencies in the microwave and higher frequency regions, as desired, wherever a known absorption line is present in the atmosphere. For example, in the frequency band extending from 10 kmc. to 400 kmc., water vapor absorption lines occur at frequencies of about 235 kmc., 110 kmc., 182 kmc. and 320 kmc.; and oxygen absorption lines occur at frequencies of 57.4 kmc. and about 117 kmc. If the higher frequency regions known as the near infrared region and mid-infrared regions, and being measured in wavelengths extending from about .75 micron to about 30 microns, a number of absorption lines occur at different wavelengths in these regions due to water vapor, carbon dioxide, and ozone present in the atmosphere. Similarly, atmospheric absorption lines are present in other bandwidths and reference is made to the published technical literature setting forth the numerous known absorption line frequencies throughout the electromagnetic wave spectrum. For example, in addition to numerous other articles, reference is made to the publication of the Massachusetts Institute of Technology entitled "Atmospheric Absorption of 10–400 kmcps" by E. S. Rosenberg, dated August 15, 1960, Report No. 82G–0021. Reference is also made to the June 1957 issue of the Journal of the Optical Society of America, vol. 47, Number 6, page 491, for an article entitled "Transmission by Haze and Fog in the Spectral Region 0.35 to 10 microns" by A. Arnulf and J. Bricard.

Although but preferred embodiments of the invention have been illustrated and described, it is believed evident that many modifications may be made without departing from the spirit and scope of the invention. Accordingly, this invention should be considered as being limited only according to the following claims appended hereto.

What is claimed is:

1. In a process for measuring the distance between two objects displaced by a selective frequency absorbing atmosphere, the steps of actively producing a pair of closely related different fixed frequency microwave electromagnetic radiations at one of the objects, with the frequency of one of said radiations being at the frequency of an atmospheric absorption line and being attenuated at a known rate in passing through the atmosphere and the other being at a closely related different microwave frequency being outside of any of the atmospheric absorption lines, and receiving both radiations at the second object and comparing the relative attenuations of the two radiations to determine the distance between the objects.

2. In the process of claim 1, the step of receiving and comparing the two radiations including the steps of separating the atmospherically generated noise radiations at the same frequency from one of the actively produced radiations.

3. In the process of claim 2, the step of separating the atmospheric noise being performed by modulating said one of the actively produced radiations to vary its characteristics over the substantially constant characteristics of the noise.

4. In the process of claim 3, the step of modulating said radiation at the frequency of the absorption line to separate the noise from the active radiation by pulsing that radiation.

5. In the process of claim 4, the additional step of propagating said active radiations outwardly at a plurality of different angular positions from said one object and providing different modulations on said radiations at each of said different angular positions in a predetermined coded arrangement, and detecting said modulations at the second object to determine its angular bearing with respect to the first object.

6. In a process for determining the distance between two objects separated by a medium that permits the propagation of electromagnetic radiations therethrough while selectively attenuating different frequencies of radiation at different rates, the steps of actively producing a pair of electromagnetic radiations to pass between the two objects, with the pair of radiations being each at a different known frequency that is attenuated at a different rate in passing through the medium, detecting the difference in the attenuation of the two radiations after traversing the distance between the objects thereby to determine the distance traveled by the radiations, the step of detecting the difference between the attenuations of the two radiations being performed by modulating that radiation being attenuated at the higher rate thereby to distinguish said radiation from any extraneous noise radiations being produced in the propagating medium.

7. In the process of claim 6, said pair of radiations being actively produced at one of said objects and detected at the other of said objects.

8. In the process of claim 6, said pair of radiations being actively produced at one of said objects and being detected at said same object after reflection from said other object.

9. In the process of claim 6, said pair of radiations being actively produced at one of said objects and being detected at the other said object, and the additional step of producing said radiations to emanate from said one object in a plurality of different directions through said medium and differently modulating said radiation in each different direction according to a predetermined pattern, and said detecting step including the step of detecting and distinguishing said modulation thereby to determine the direction between the objects as well as the range thereof.

10. In the process of claim 6, a plurality of additional objects each displaced from each other and from the pair of objects, said additional objects and one of said two objects producing said modulated radiations and the other of said two objects detecting said radiations, and the additional step of angularly scanning the radiations produced at said additional objects and said one object each at a different predetermined rate, whereby said detecting object may distinguish between each of said additional objects and said first object and determine its range and bearing from any one of said additional and first objects.

11. In a process for enabling an object to determine its range and bearing from any one of a plurality of displaced locations, each being separated from said object by a medium that permits the propagation of electromagnetic radiations therethrough while selectively attenuating different frequencies of radiation at different rates, the steps of producing at each location a first radiation at one fixed frequency and a second radiation at a different fixed frequency, with one of said radiations being attenuated by said medium at a higher rate than the other; at each location modulating that radiation being attenuated at a higher rate; scanning the radiations produced at each different location at a predetermined different scanning speed than that of the other locations; detecting at said object the radiations from said locations and determining the desired location from the scanning rates of the different radiations detected, and detecting the difference in the attenuation of the two radiations produced from the desired location and detecting the modulation of the radiations to determine the range and bearing of the object from the desired location.

12. In a process for determining the range between two displaced objects in the atmosphere by determining the degree of attenuation of an electromagnetic beam at an atmospheric absorption line frequency when traversing the objects, the steps of separating the atmospherically generated noise signal at the absorption line frequency from the electromagnetic beam at the same frequency, said steps being performed by varying the electromagnetic beam to change its characteristics distinguishably from the noise signal, detecting the beam and noise signal and separating the electromagnetic beam from the noise signal, and employing the beam from which the noise signal has been separated to determine the range between the objects.

13. In the process of claim 12, the electromagnetic wave being produced at one of said objects and detected at the other.

14. In the process of claim 12, the electromagnetic wave being produced at one of the objects and detected at the same object after reflection from the other object.

15. In a process for measuring the distance between two displaced objects in a selective frequency absorbing atmosphere, producing two closely related fixed frequency signals with one being at a frequency of an absorption line of the atmosphere and the other being at a close but different frequency being outside of an absorption line, directing said signals to traverse the distance between the two objects, detecting both signals after they have traversed the distance between the objects, removing from the signal at the atmospheric absorption line frequency any noise signal produced by the atmosphere at that frequency, and comparing the respective attenuations of the two signals after they have traversed said distance and after the noise has been removed from the absorption line frequency signal.

References Cited in the file of this patent
UNITED STATES PATENTS 1,939,685    Gage _____ Dec. 19, 1933